United States Patent

Raghavan

[11] Patent Number: 6,038,269
[45] Date of Patent: Mar. 14, 2000

[54] DETECTION FOR DIGITAL COMMUNICATION RECEIVERS

[75] Inventor: Sreen A. Raghavan, La Jolla, Calif.

[73] Assignee: National Semiconductor Corporation, Santa Clara, Calif.

[21] Appl. No.: 08/974,450

[22] Filed: Nov. 20, 1997

[51] Int. Cl.[7] .................................................. H04L 27/06
[52] U.S. Cl. ........................ 375/340; 375/341; 714/796
[58] Field of Search ................................. 375/341, 340, 375/348, 342; 371/43.8, 43.3

[56] References Cited

U.S. PATENT DOCUMENTS

| 5,291,499 | 3/1994 | Behrens et al. | 371/43.8 |
|---|---|---|---|
| 5,502,735 | 3/1996 | Cooper | 375/340 |
| 5,841,478 | 11/1998 | Hu et al. | 375/340 |
| 5,859,861 | 1/1999 | Oh | 375/341 |

OTHER PUBLICATIONS

American National Standard for Information Systems, "Fibre Distributed Data Interface (FDDI)—Part: Token Ring Twisted Pair Physical Layer Medium Dependent (TP–PMD)", ANSI X3.263:199X (1995), pp. 239–329.

Lee, E.A. et al., Digital Communications (1988), pp. 319–345.
Oppenheim, A.V. et al., "Discrete–Time Signal Processing" (1989), pp. 149–191.
Lee, E.A. et al., Digital Communications (1988), pp. 34–42.
Sklar, B. Digital Communications, Fundamentals and Applications (1988), pp. 333–337.
Institute of Electrical and Electronics Engineers, New York, "IEEE Standards for Local and Metropolitan Area Networks", IEEE Standard 802.3u–1995 CSMA/CD Access Method, Type 100Base–T (1995).
IEEE 802.3ab, Gigabit Long Haul Copper Physical Layer Standards Committee, (1997).

*Primary Examiner*—Temesghen Ghebretinsae
*Attorney, Agent, or Firm*—Skjerven, Morrill, MacPherson, Franklin, & Friel, LLP; Alan H. MacPherson; Gary J. Edwards

[57] ABSTRACT

A new detection system that improves the detection signal-to-noise (SNR) ratio of a digital communication system suffering from intersymbol interference is described. The detection system utilizes the sample power contained in the intersymbol interference created by the dispersive nature of the communication channel. Significant SNR advantages over more commonly used decision-feedback equalizers (DFE) and linear equalizers are realized.

28 Claims, 8 Drawing Sheets

DETECTION FOR DIGITAL COMMUNICATION RECEIVERS

BACKGROUND

1. Field of the Invention

This invention relates to improving the signal-to-noise ratio of a digital communication system suffering from intersymbol interference.

2. Background

The dramatic increase in desktop computing power driven by intranet-based operations and the increased demand for time-sensitive delivery between users has spurred development of high speed Ethernet LANs. 100BASE-TX Ethernet, using existing Category 5 copper wire, and the newly developing 1000BASE-T Ethernet for Gigabit/s transfer of data over Category 5 copper wire require new techniques in high speed symbol processing. In addition, high speed processing of data is in demand for use with existing switching boards which may currently be required to process data at a rate of 1000 Mb/s per port. Gigabit per second transfer can be accomplished utilizing four twisted pairs and a 125 megasymbol/s transfer rate on each pair where each symbol represents two bits.

Physically, data is transferred using a set of voltages where each voltage represents one or more bits of data. Each voltage in the set is referred to as a symbol and the whole set of voltages is referred to as a symbol alphabet.

One system of transferring data at high rates is Non Return to Zero (NRZ) signaling. In NRZ, the symbol alphabet $\{A\}$ is $\{-1, +1\}$. A logical "1" is transmitted as a positive voltage while a logical "0" is transmitted as a negative voltage. At 125 M symbols/s, the pulse width of each symbol (the positive or negative voltage) is 8 ns.

An alternative modulation method for high speed symbol transfer is MLT3 and involves a three level system. (See American National Standard Information system, *Fibre Distributed Data Interface (FDDI)—Part: Token Ring Twisted Pair Physical Layer Medium Dependent (TP-PMD)*, ANSI X3.263:199X). The symbol alphabet for MLT3 is $\{A\}=\{-1, 0, +1\}$. In MLT3 transmission, a logical 1 is transmitted by either a −1 or a +1 while a logic 0 is transmitted as a 0. A transmission of two consecutive logic "1"s does not require the system to pass through zero in the transition. A transmission of the logical sequence ("1", "0", "1") would result in transmission of the symbols (+1, 0, −1) or (−1, 0, +1) depending on the symbols transmitted prior to this sequence. If the symbol transmitted immediately prior to the sequence was a +1, then the symbols (+1, 0, −1) are transmitted. If the symbol transmitted before this sequence was a −1, then the symbols (−1, 0, +1) are transmitted. If the symbol transmitted immediately before this sequence was a 0, then the first symbol of the sequence transmitted will be a +1 if the previous logical "1" was transmitted as a −1 and will be a −1 if the previous logical "1" was transmitted as a +1.

The detection system in the MLT3 standard, however, needs to distinguish between 3 levels, instead of two levels in a more typical two level system. The signal to noise ratio required to achieve a particular bit error rate is higher for MLT3 signaling than for two level systems. The advantage of the MLT3 system, however, is that the energy spectrum of the emitted radiation from the MLT3 system is concentrated at lower frequencies and therefore more easily meets FCC radiation emission standards for transmission over twisted pair cables. Other communication systems may use a symbol alphabet having more than two voltage levels in the physical layer in order to transmit multiple bits of data using each individual symbol.

A block diagram of a typical digital communication transmission system is illustrated in FIG. 1A. In FIG. 1A, the transmitted data is represented by the symbol sequence $\{a_k\}$. The transmitted symbols in the sequence $\{a_k\}$ are members of the symbol alphabet $\{A\}$. In the case of two level NRZ signaling, the symbol alphabet $\{A\}$ is given by $\{-1, +1\}$. The index k represents the time index for that symbol, i.e. at sample time k, the symbol being transmitted is given by $a_k$. The channel response is represented by the channel function $f(z)$. The signal, $x_k$, is summed with the noise sample $n_k$ to represent the random noise on the transmission line. The signal, suffering from both the channel distortion and the random noise, is input to the detector.

For the sake of simplicity, a baseband transmission system is assumed, although the techniques shown are easily extended to a passband transmission system. (See E. A. LEE AND D. G. MESSERCHMITT, DIGITAL COMMUNICATIONS (1988)) It is also assumed that the channel model includes the effect of transmit and receive filtering. In addition, the transmission channel is assumed to be linear in that two overlapping signals simply add as a linear superposition. Therefore, the channel function polynomial can be defined as $$f(Z)=f_0+f_1Z^{-1}+f_2Z^{-2}+\ldots+f_NZ^{-N}, \qquad (1)$$

where $f_0, \ldots, f_j, \ldots, f_N$ are the polynomial coefficients representing the dispersed component of the (k−j)th symbol present in the $a_k$th symbol and N is a cut-off integer such that $f_j$ for $j>N$ is negligible. The polynomial $f(Z)$ represents the Z-transformation of the frequency response of the transmission channel. ($Z^{-1}$ represents a one period delay) See A. V. OPPENHEIM & R. W. SCHAFER, DISCRETE-TIME SIGNAL PROCESSING 1989.

The noiseless output of the channel at sample time k is then given by $$x_k=f_0^*a_k+f_1^*a_{k-1}+\ldots f_N^*a_{k-N}, \qquad (2)$$

where, without loss of generality, fo can be assumed to be 1. Thus, the channel output signal at time k depends, not only on transmitted data at time k, but past values of the transmitted data. This effect is known as "intersymbol interference" (ISI). See LEE & MESSERSCHMITT.

Intersymbol interference is a result of the dispersive nature of the communication channel. The IEEE LAN standards require that systems be capable of transmitting and receiving data through at least a 100 meter cable. FIG. 1C shows a transmission bit stream with the effects of dispersion. FIG. 1D shows the power spectrum of the dispersed pulse with frequency. In a 100 meter cable, the signal strength at the Nyquist frequency of 62.5 Mhz is reduced nearly 20 db at the receiving end of the cable. Given this dispersion, a single symbol may affect symbols throughout the wire.

The noise element of the signal is represented by the sequence $\{n_k\}$. Therefore, the noisy output of the channel is given by $$y_k=x_k+n_k, \qquad (3)$$

where the noise samples $\{n_k\}$ are assumed to be independent and identically distributed Gaussian random variables (see LEE & MESSERSCHMITT) with variance equal to $\sigma^2$.

Most state-of-the art communication systems use two types of detectors for combating the ISI described by equation (2). These two detectors, Linear Equalization and Decision Feedback Equalization, are shown in FIG. 1B.

A liner equalizer having m+1 multipliers is illustrated in FIG. 2. In FIG. 2, the symbol $Y_k$ is inputted to a delay array 10 having delays ($D_1$ through $D_m$) which, at each stage, delay the symbol by one time period. A set of multipliers 20 having multipliers $M_0$ through $M_m$ multiply each of the m+1 symbols in the array of delays $D_1$ through $D_m$ by a corresponding coefficient $C_0$ through $C_m$. The adder 30 adds together the outputs of multipliers $M_0$–$M_m$ to obtain the resulting signal $$a_k' = C_0 y_k + C_1 y_{k-1} + \ldots + C_m y_{k-m}. \quad (4)$$

The signal $a_k'$ from the linear equalizer is inputted to decider 40 which decides on the output symbol $\hat{a}_k$. The output symbol $\hat{a}_k$ is the symbol from the symbol alphabet {A} which best approximates the input signal $a_k'$.

The multiplier coefficients, $C_0$ through $C_m$, define a transfer function T given by $$T = C_0 + C_1 Z^{-1} + \ldots + C_m Z^{-m}. \quad (5)$$

The coefficients $C_0$ through $C_m$ may be chosen by an intelligent algorithm in an adaptive chip in order optimize the functioning of the equalizer. A zero-forcing linear equalizer (ZFLE) has a transfer function T given by the inverse of the frequency response of the channel. A minimum mean squared error based linear equalizer (MMSE-LE) optimizes the mean squared error between the transmitted data and the detected data, and hence finds a compromise between the un-canceled ISI at the output terminal of the equalizer and the noise variance.

The primary disadvantage of a linear equalizer is that, while removing the ISI due to the channel, it also causes the noise to be enhanced. This is especially true in a channel like the twisted copper pair channel, where the frequency response of the channel has significant attenuation across the transmitted signal bandwidth. Hence, in twisted-pair channels (which are commonly used in applications such as 10/100/1000BASE-TX Ethernet and digital subscriber loops), the noise {$n_k$} may be enhanced by the linear equalizer detector, reducing noise immunity.

FIG. 3 illustrates a Decision Feedback Equalizer (DFE) with $N_{ff}$ multipliers in the feed-forward filter and $N_{fb}$ multipliers in the feedback filter. The input signal $y_k$ is inputted to the feed-forward filter 100. The resulting signal is added with the resulting signal from the feed-back filter 200 in adder 300. The added signal is inputted to circuit 400 which determines the output $\hat{a}_k$ symbol of the equalizer.

In feed-forward filter 100, the input signal $y_k$ is inputted to a feed-forward delay array having delays $D_1^{ff}$ through $D_{ff-1}^{ff}$. Each delay delays the signal by one period so that the delay array 101 stores $N_{ff}$–1 past input signals. Each of the stored signals is multiplied by a corresponding coefficient $C_0$ through $C_{Nff-1}$ by multipliers $M_0^{ff}$ through $M_{nff-1}^{ff}$. The results of each of the multipliers $M_0^{ff}$ through $M_{nff-1}^{ff}$ are added together in adder 103 so that the signal inputted to adder 300 on line 301 is given by $$a_k' = C_0 y_k + C_1 y_{k-1} + \ldots + C_{Nff-1} y_{k-Nff+1}. \quad (6)$$

The feed-back filter 200 inputs the output symbol $\hat{a}_k$ to a feed-back delay array 201 having delays $D_0^{fb}$ through $D_{Nfb-1}^{fb}$. The feed-back delay array 201 stores $N_{fb-1}$ past determined symbols, $\hat{a}_{k-Nfb+1}$ through $\hat{a}_{k-1}$. The output symbols of the feed back delay array 201 are inputted to multipliers 202, $M_0^{fb}$ through $M_{Nfb-1}^{fb}$ respectively. The resulting signals from multipliers 202 are added in adder 203 so that the input signal of adder 300 on line 302 is given by $$a_k'' = b_0 \hat{a}_{k-1} + b_1 \hat{a}_{k-2} + b_{Nfb-1} \hat{a}_{k-Nfb+1}. \quad (7)$$

Adder 300 adds the input signal on line 301 with the negative of the input signal on line 302 to obtain $a_k'$–$a_k''$ which is received by decider 400. Decider 400 decides on the output symbol $\hat{a}_k$. The output symbol $\hat{a}_k$ arrived at by decider 400 is the symbol in symbol alphabet {A} which most closely approximates the signal $a_k'$–$a_k''$ at the input terminal of decider 400.

The DFE operates on the principle that if the past transmitted data is correctly detected, then the ISI effect of these past data symbols can be canceled from the current received signal prior to detection. For a zero-forcing DFE, the feed-forward finite impulse response filter (FF-FIR) transfer function is set to 1 (i.e., $C_0$=1 and $C_1$ through $C_m$ are 0), and the feedback FIR (FB-FIR) transfer function is given by [f(z)–1], f(z) being the channel function.

Since past detected data samples contain no noise, DFE does not suffer from noise enhancement. However, DFE suffers from error propagation. If one of the past detected symbols is incorrect, then the effects of that error propagate to more symbol decisions in the future.

In addition, the DFE has the disadvantage that the sample power contained in the dispersive power of the channel, and represented by the ISI coefficients, is discarded prior to detection of the current symbol and therefore wasted. More precisely, the system has information regarding the current transmitted data symbol in the prior received signals which DFE does not utilize.

Also, because the equalizer is a feedback equalizer, pipelining of the feedback filtering operation is not possible, unlike a linear equalizer whose operation can be pipelined. Yet another disadvantage of a DFE versus a linear equalizer is that a linear equalizer depends only on past input signals to the detector while a DFE depends on past output symbols.

SUMMARY OF THE INVENTION

In accordance with the invention, a new detector and new detection method is presented. The sequence detector estimates an entire sequence of transmitted data and makes use of most or all of the sample power in the ISI symbols. This leads to a significant improvement in the performance of the detector. The detector presented here applies equally well to the NRZ or MLT3 standards as well as any other standards that may be developed for transmitting symbols.

Many systems utilize analog signal processing techniques to remove the ISI from the system. According to this invention, a digital signal processor (DSP) is used The bulk of the noise element therefore comes from the error in the analog to digital converter. In that case, the noise element nk is added to the input signal $x_k$ at the receiver end of the transmission wire. Digital processing has the advantage that digital chips require lower power and have greater stability than analog chips.

An algorithm, the Viterbi algorithm (See B. SKLAR, DIGITAL COMMUNICATIONS, FUNDAMENTALS AND APPLICATIONS (1988)), is used in the sequence detector to track the amount of ISI from previous symbols which appear in the signal currently being detected. A minimization procedure is utilized which calculates the most likely set of symbols which gives rise to the currently observed signal.

In another embodiment, the channel is linearly equalized to obtain a shortened impulse response, g(Z), of length L≦N. The reduced sequential detector performs sequence detection assuming that the overall equalized channel is given by g(Z). In yet another embodiment, linear equalization and DFE filtering are added to the detector system to simplify implementation.

DETAILED DESCRIPTION OF THE INVENTION

Figure 4:
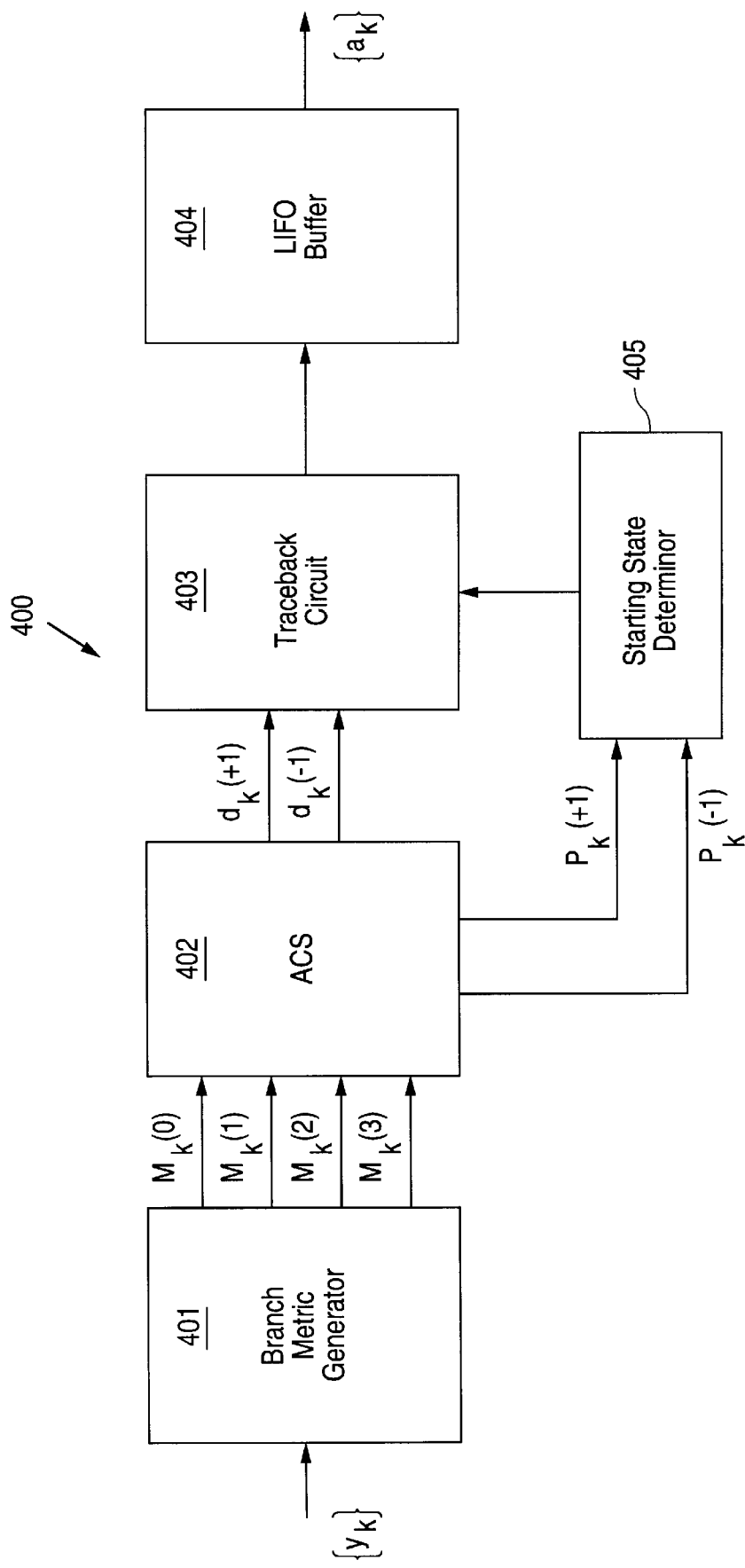
FIG. 4 shows a block diagram of the sequential detector for an example ISI channel.

In accordance with the present invention, FIG. 4 shows a block diagram of a sequence detector for the case $\{A\}=\{-1, +1\}$ and N=1, although the system is generalizable to larger alphabets and more ISI interference (A>2 and N>1). The detector includes a Branch Metric Generator, an Add-Compare-Select (ACS) unit, Traceback Circuitry, a Last-In-First-Out (LIFO) buffer, and a starting state determiner.

The ISI in the sequence equalizer displayed in FIG. 4 is caused by just one previously transmitted symbol. Thus, $$y_k = a_k + f_1 a_{k-1} + n_k. \tag{8}$$

The sequence detector estimates the transmitted data sequence $\{a_k\}$ from the sequence of received signals $\{y_k\}$.

The state of the detector, $S_k$, is defined as the past data symbol estimates. In general, a system with a symbol alphabet having A symbols and which suffers intersymbol interference from N previous symbols will have $A^N$ possible states. Each state corresponds to a possible transition path through the N previous symbols. For example, a system with two symbols, $\{A\}=\{+1, -1\}$, and N=2 will have four possible sequence states of the system: symbol +1 at time k-2 and symbol +1 at time k-1; symbol +1 at time k-2 and symbol -1 at time k-1; symbol -1 at time k-2 and symbol +1 at time k-1; and symbol -1 at time k-2 and symbol -1 at time k-1. The sequence detector for the example shown in FIG. 4 has two states, +1 and -1, corresponding to the two symbols in the alphabet $\{A\}$.

Figure 5:
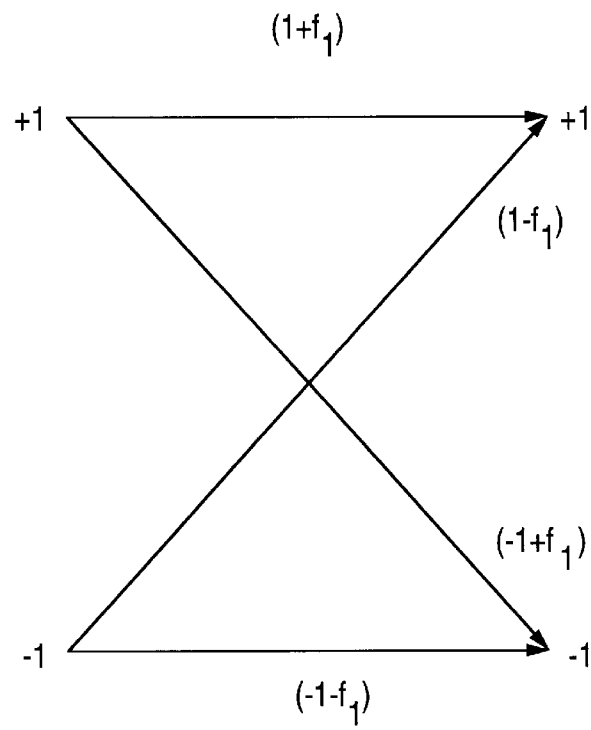
FIG. 5 shows a trellis diagram for the example ISI channel of FIG. 4.

The trellis diagram depicting the state transition from time (k-1) to time k for the example shown in FIG. 4 is shown in FIG. 5. A trellis diagram provides a graphical mechanism for predicting what the signal output would be for the channel in transitions from one state in time k-1 to another state at time k. From the trellis diagram in FIG. 5, a transition from state +1 at time k-1 to state +1 at time k would result in a predicted signal output (without noise) of $1+f_1$. A transition from state -1 at time k-1 to state -1 at time k would result in a predicted signal output of $-1-f_1$. A transition from state -1 at time k-1 to state +1 at time k results in a predicted signal output of $1-f_1$ and a transition from state +1 at time k-1 to state -1 at time k results in a predicted signal output of $-1+f_1$.

In the detector shown in FIG. 4, the branch metric unit generates four distance metrics corresponding to the four branch labels in the trellis diagram of FIG. 5. In the preferred embodiments, the distance metrics are given by the Euclidean distances $$M_k(0)=[y_k-1-f_1]^2,$$

$$M_k(1)=[y_k+1-f_1]^2, \tag{9}$$

$$M_k(2)=[y_k-1+f_1]^2, \text{ and}$$

$$M_k(3)=[y_k+1+f_1]^2.$$

Other metrics which represent the difference between the input symbol and the predicted input symbols assuming each of the possible state transitions may be used as the distance metrics. In general, there will be branch metric for transitions from any state S' at time k-1 to state S at time k, $A^{2N}$ for a system with A symbols and N interfering symbols if all transitions are allowed.

The add-compare-select (ACS) circuit in FIG. 4 updates a state metric for each possible state of the system, denoted by $p_k(+1)$ and $p_k(-1)$ in this example, at each time step k. For a two symbol system as shown in FIG. 4, the state metrics are given by:

$$p_k(+1)=\min[p_{k-1}(+1)+M_k(0), p_{k-1}(-1)+M_k(2)] \text{ and}$$

$$p_k(-1)=\min[p_{k-1}(+1)+M_k(1), p_{k-1}(-1)+M_k(3)]. \tag{10}$$

In general, the state metrics represent the accumulated distance metrics of past states along transition paths that minimize the accumulated distance metric. Therefore, the transition metric for state S at time period k, $p_k(S)$, is the accumulated distance metric for previous states along a transition path which ends at state S at time period k, state S being one of the possible states of the system. At time k-1, the state of the system may be at any state S' in the group of possible states of the system. Therefore, $p_k(S)$ is the minimum one of $p_{k-1}(S')$ plus the distance metric for transition from S' to S. A mathematical proof that this technique results in the least detection error is given in the Appendix.

In the example of FIG. 4, the comparison results, $d_k(+1)$ and $d_k(-1)$, are stored in the traceback circuit for each of the two states. The comparison results indicate the state at time period k-1 which results in the state metric $p_k(S)$ for state S at time period k. In the two symbol, N=1 example of FIG. 4, if $$p_{k-1}(+1)+M_k(0) \leq p_{k-1}(-1)+M_k(2), \tag{11}$$

then a "+1" data value is stored for time k in the memory allocated for state +1 in the traceback circuit, $d_k(+1)$. Otherwise, a "-1" is stored for time k in the memory allocated for state +1 in the traceback circuit. Similar results are stored in the memory allocated for state −1 in the traceback circuit. In the more general case, $d_k(S)$ points toward the state S' at time k−1 from which results the lowest state metric for arriving at state S at time k.

When it is time for decoding, the traceback circuit traces back from the best possible current state (the state with the smallest state metric), and fetches the data from the traceback memory. If the traceback depth is 2*TB, then it is expected that a traceback of TB is performed every TB/2 sample times and the traceback circuit outputs TB/2 data symbols. (TB is an even integer). A greater traceback depth will result in less error in determining the final sequence of symbols at a cost of including more memory in the chip. Typical traceback depths are 8 or 16.

During the traceback procedure, the starting state determiner picks the starting state based on whichever state metric is less. The traceback circuit follows the sequence back through the stored comparison results. The earliest symbols which result in the earliest states, the earliest TB/2 symbols in the A=2 and N=1 examples, are written into the last-in-first-out buffer. In the preferred embodiments, the new comparison results are stored in the memory locations previously occupied by the outputted results.

The traceback circuit determines the optimum sequence of symbols based on the state metrics stored in the starting state determiner. The starting state determiner also initializes the traceback procedure by setting a starting sequence.

The LIFO circuitry simply time-reverses the data coming out of traceback memory because the traceback is performed from the current time to previous times.

Sequence Detection with Linear Equalization

Figure 6:
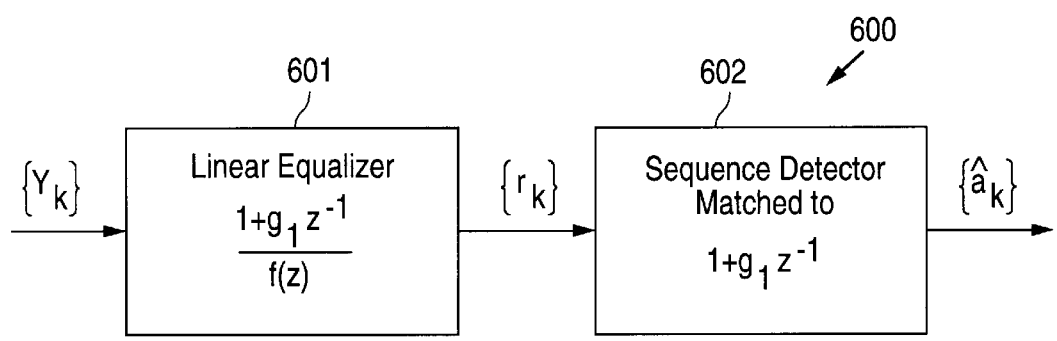
FIG. 6 shows a reduced sequential detector using a linear equalizer.

When the channel ISI length N is large, or if the transmitted symbol alphabet size A is large, the above method of full sequence estimation becomes impractical at high symbol rates. Full sequence estimations require the implementation of $A^N$ states in the detector. Accordingly, the preferred embodiment of the invention, as shown in FIG. 6, uses a linear equalizer to reduce the number of ISI symbols seen by the sequence detector.

In this example, assume that the channel input alphabet size is 2, i.e. A={−1, +1}, and that the reduced ISI length (as seen by the sequence detector) is L=1. As before, the technique is applicable to larger alphabets and may accommodate more than one interfering symbol in the reduced length.

The output of the linear equalizer with A=2 and L=1 is given by $$r_k = a_k + g_1 * a_{k-1} + h_k, \tag{12}$$

where $g_1$ is the equalized ISI coefficient and $h_k$ is the noise component of the output of the linear equalizer. The linear equalizer transfer function (in Z-transform notation, See A. V. OPPENHEIM AND R. W. SCHAFER, DISCRETE-TIME SIGNAL PROCESSING, (1989)) is given by $$E(z) = (1 + g_1 z^{-1})/f(z). \tag{13}$$

The coefficient $g_1$ is chosen to minimize the noise variance at the output of the equalizer.

Figure 1A:
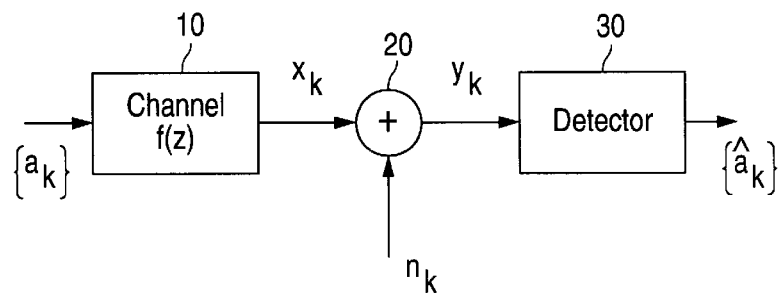
FIG. 1A shows a typical digital communication system.
Figure 1B:
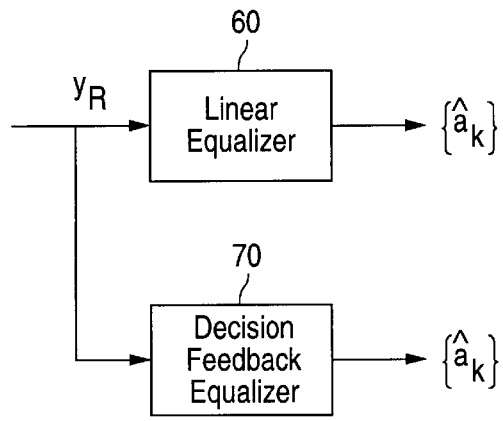
FIG. 1B shows the two common detection systems for combating ISI.
Figure 1C:
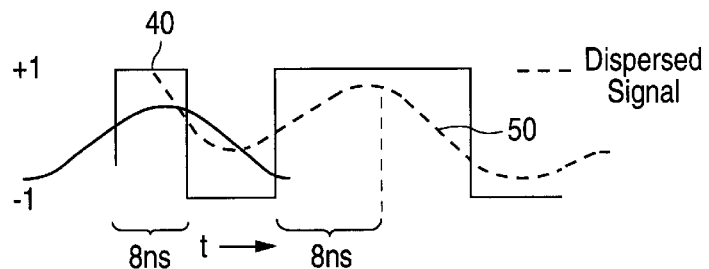
FIG. 1C shows dispersion across the transmission channel for one pulse.
Figure 1D:
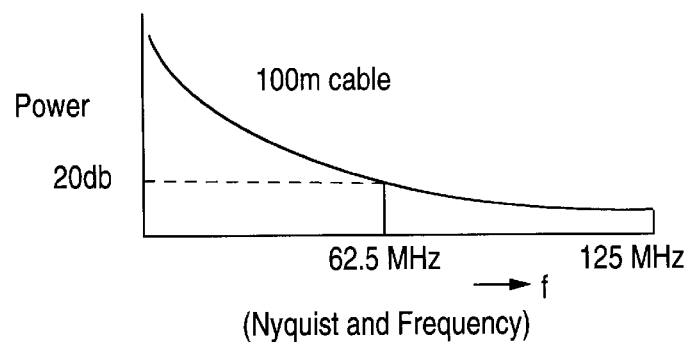
FIG. 1D shows the pulse power as a function of frequency.
Figure 2:
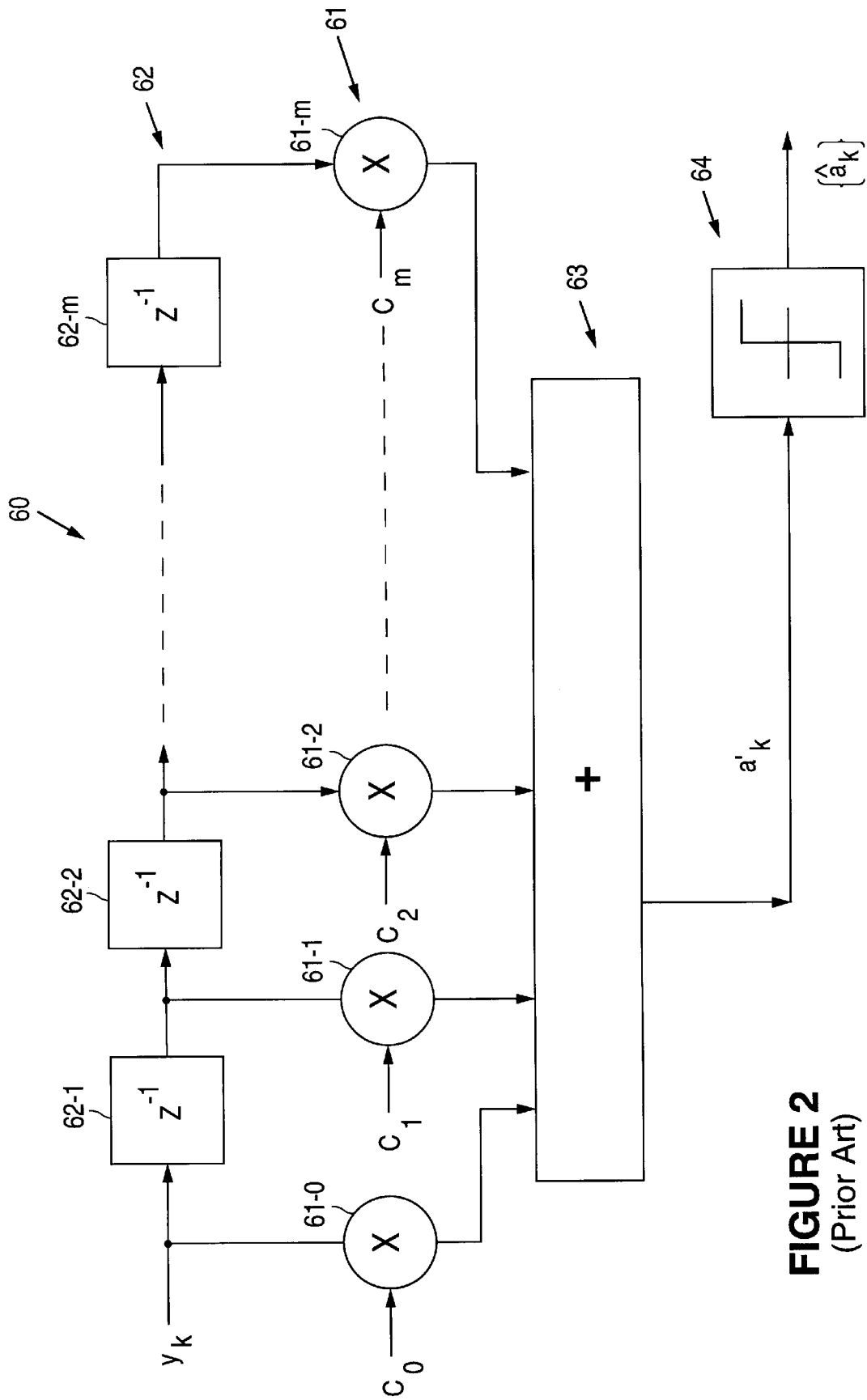
FIG. 2 shows a Linear Equalizer Implemented with an FIR Filter.
Figure 3:
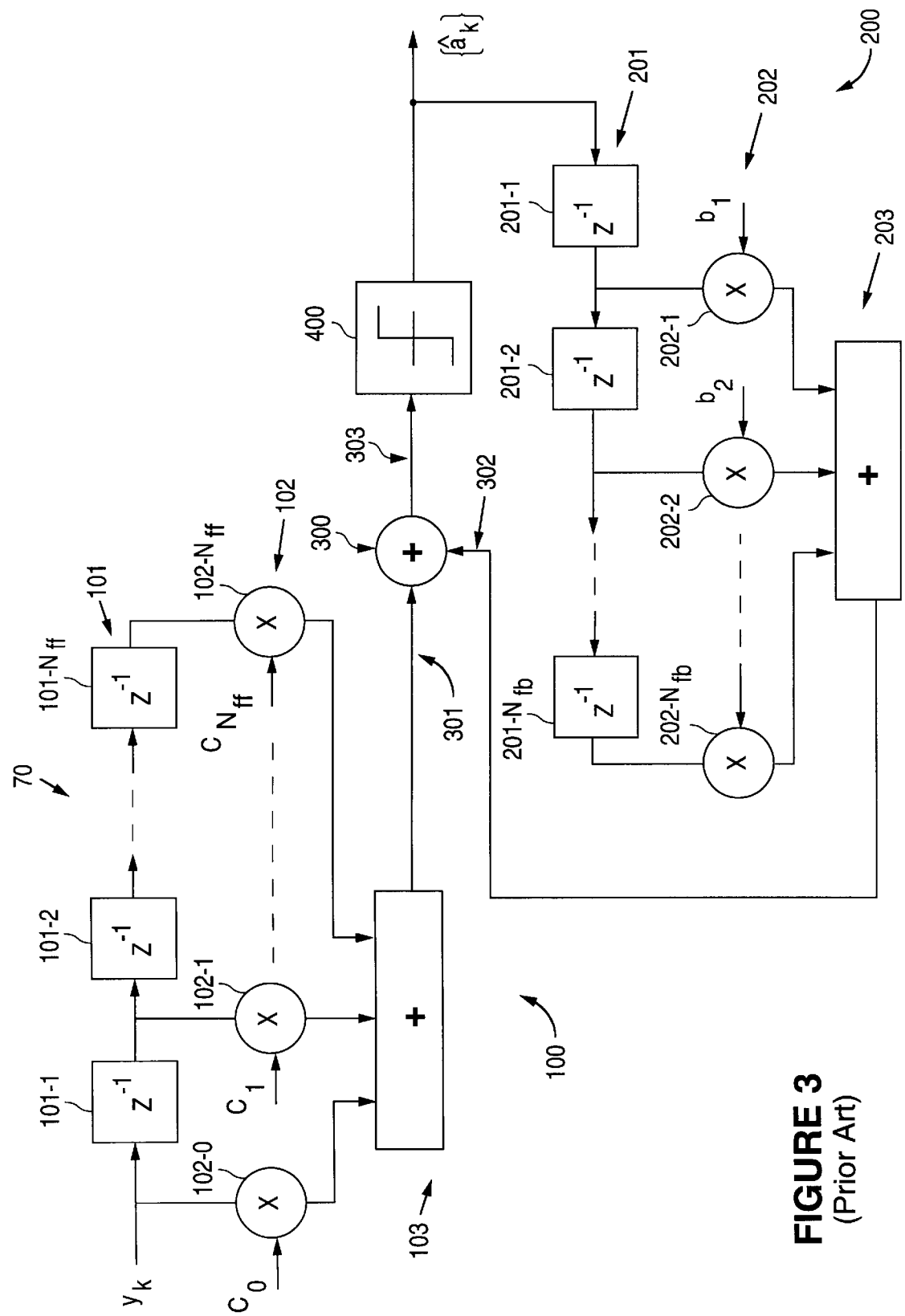
FIG. 3 shows a Decision Feedback Equalizer.

In the preferred embodiment, the reduced sequence equalization is implemented adaptively. One architecture used for adaptive implementation is a linear equalizer implementing a transfer function C(Z)=1/f(Z) adaptively followed by a $(1+g_1 z^{-1})$ filter. By implementing both equalizers adaptively, optimal performance can be achieved for any cable length. The linear equalizer C(Z) can be adaptively implemented by using the least mean squares (LMS) algorithm (See E. A. LEE AND D. G. MESSERCHMITT, DIGITAL COMMUNICATIONS (1988)) and a finite impulse response filter as shown in FIG. 2.

The coefficient $g_1$ is chosen adaptively in the sequence detector by observing the frequency response of the linear equalizer C(Z). From the linear equalizer, the channel frequency response is deduced and gis selected from a look-up table. In a particular implementation, two possible values of $g_1$ (0 and ½) are used. One of the two possible coefficients is chosen for $g_1$ by observing the two largest coefficients of the linear equalizer implementing C(Z).

The benefits of combining linear equalization with sequence detection include (a) reduced complexity in the sequence detector, especially for large N, and (b) reduced noise enhancement in the linear equalization.

In the example of the preferred embodiment described in FIG. 6, the number of states in the sequence estimator is reduced from $2_N$ to 2. The reduced state sequence estimator can be implemented using the Viterbi algorithm described in the previous embodiment where $f_1$ is replaced by $g_1$ to match the linear equalizer and $y_k$ is replaced by $r_k$ in the metric computations of Equation 5.

Seguence Detection with Linear Equalization and Decision Feedback

Figure 7:
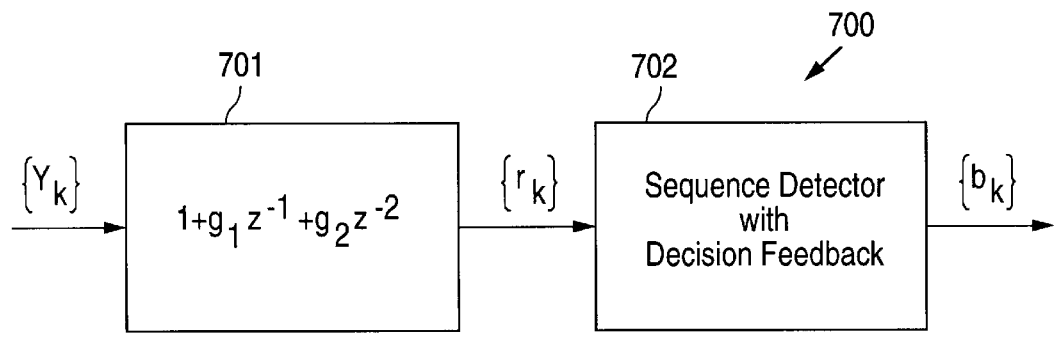
FIG. 7 shows a reduced sequential detector using linear equalization and Decision Feedback Sequence Equalization.

FIG. 7 shows an embodiment of the reduced state sequence estimation which utilizes linear equalization and decision-feedback. In this embodiment, the linear equalizer equalizes the channel to a pre-determined ISI polynomial G(z) of length M<N. In FIG. 7, M is assumed to be 2, G(z) is given by $$G(z) = 1 + g_1 z^{-1} + g_2 z^{-2}, \tag{14}$$

and the linear equalizer transfer function is given by $$E(z) = G(z)/f(z). \tag{15}$$

Figure 8:
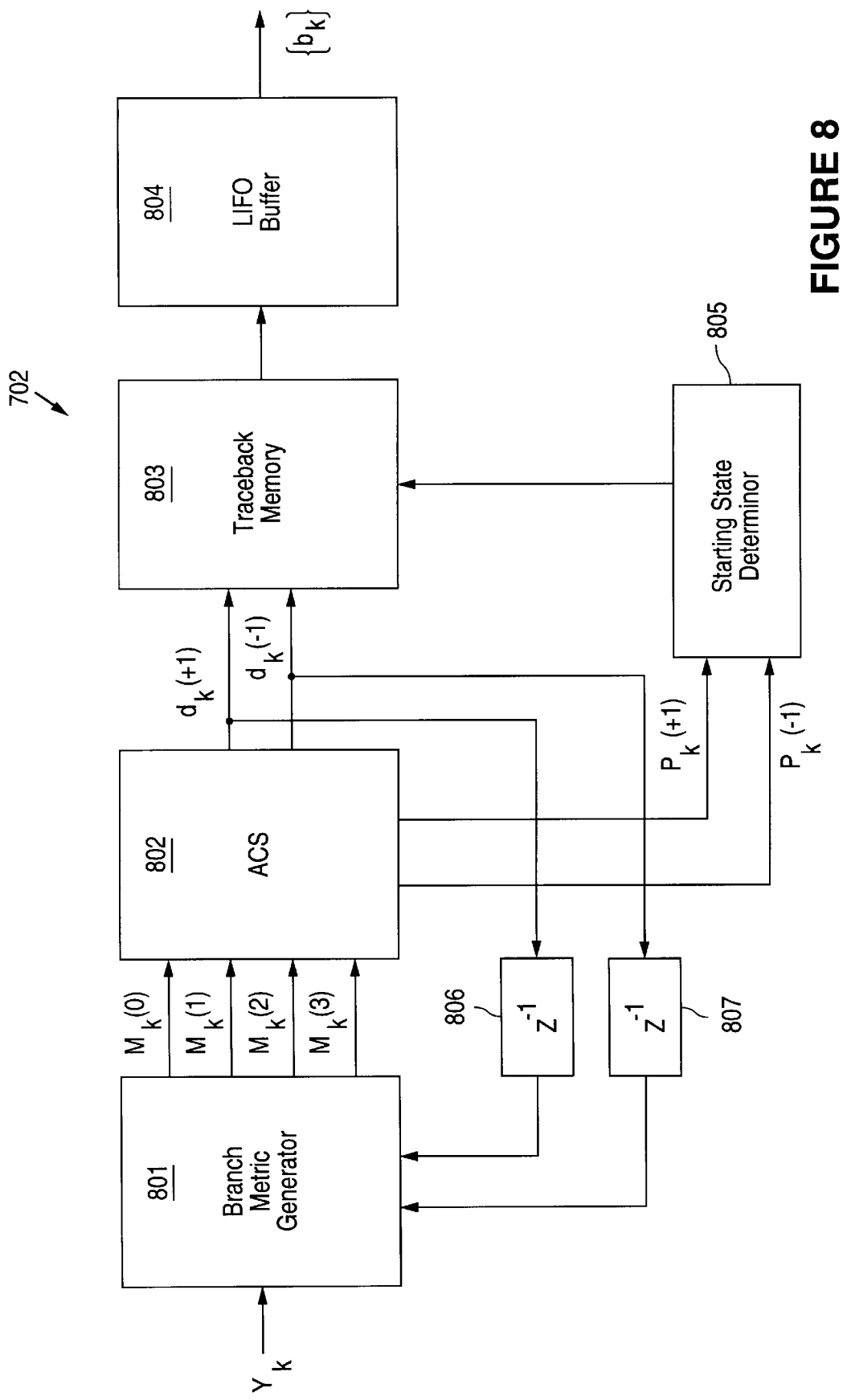
FIG. 8 shows a block diagram of a detector for ISI channel $1+g_1z^{-1}+g_2z^{-2}$.

In general, the detection technique may be used for any combination of M and N such that M<N. Although the technique may be implemented with any sized alphabet, the example shown in FIG. 8 is for A=2. In the preferred embodiment, the coefficients g1 and g2, again, are chosen adaptively.

To perform the sequence estimation using the Viterbi algorithm outlined above, the sequence detector must be implemented with four states (if the data symbols are binary valued). Instead, a reduced state sequence estimation using only two states is used as shown in FIG. 8. The branch metric computation in the trellis diagram now accounts for the intersymbol interference due to the symbol transmitted two sample times before. In the block diagram shown in FIG. 8, the branch metrics are given by $$M_k(0) = [r_k - g_2 d_{k-1}(+1) - 1 - g_1]^2,$$
$$M_k(1) = [r_k - g_2 d_{k-1}(+1) + 1 - g_1]^2, \tag{16}$$
$$M_k(2) = [r_k - g_2 d_{k-1}(-1) - 1 + g_1]^2, \text{ and}$$
$$M_k(3) = [r_k - g_2 d_{k-1}(-1) + 1 + g_1]^2.$$

In this way, the ISI due to the transmitted symbol at time (k−2) is removed from the received sample $r_k$ before the branch metric of the sequence detector that accounts for the ISI due to the transmitted symbol at time (k−1) is computed. After this calculation, the previously described calculation is performed to remove the ISI due to the (k−1)th transmitted symbol.

Application to 100Base-TX Fast Ethernet

An embodiment of this invention appropriate for application to 100Base-TX Fast Ethernet (See Institute of Electrical and Electronics Engineers, New York, *IEEE Standard 802.3u-1995 CSMA/CD Access Method, Type 100Base-T* (1995); American National Standard Information Systems, *Fibre Distributed Data Interface (FDDI)—Part: Token ring twisted pair physical layer medium dependent (TP-PMD)*, ANSI X3.263:199X) involves three-level signaling. (i.e., the binary data is physically transmitted using the MLT3 modulation method). A mapping of a binary sequence into the three-level transmission is given by the following chart:

| Binary  | 0 | 0 | 1 | 1 | 0 | 1  | 0 | 1 | 0 | 1  | 1  |
|---------|---|---|---|---|---|----|---|---|---|----|----|
| 3-Level | 0 | 0 | 1 | 1 | 0 | -1 | 0 | 1 | 0 | -1 | -1 |

In the above mapping, it is clear that a transmission sequence of $\{-1, +1\}$ (symbol $-1$ in time k-1 to symbol $+1$ in time k) is invalid, as are the sequences $\{+1, 0, +1\}$ and $\{-1, 0, -1\}$.

Figure 9:
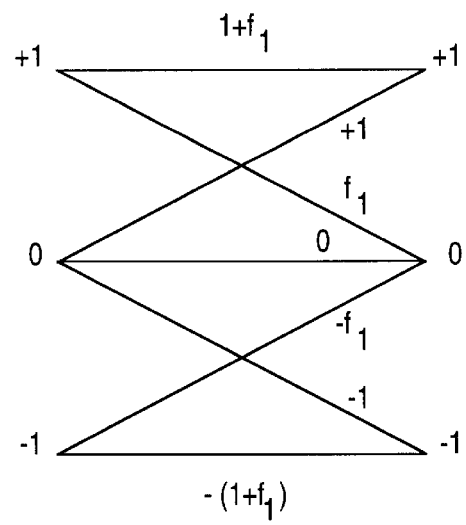
FIG. 9 shows a trellis diagram with N=1 appropriate for use with applications with three level signaling.

A trellis diagram for a symbol alphabet of $\{-1, 0, +1\}$ and N=1 which incorporates the above restrictions in allowed sequences is shown in FIG. 9. In FIG. 9, the channel function is given by $1+g_1 z^{-1}$.

Figure 10:
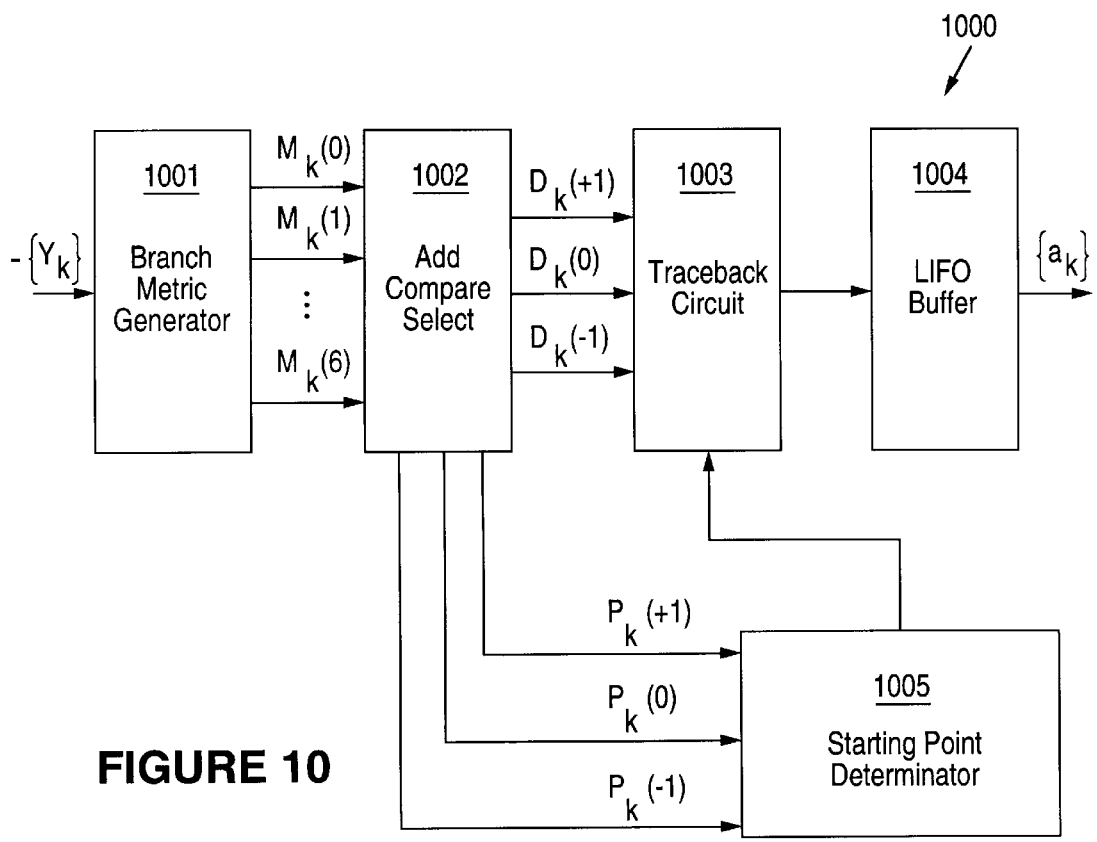
FIG. 10 shows a block diagram of a sequence equalizer with N=1 and three level signaling.

A block diagram of a sequence detector to equalize the ISI Channel with $f(z)=1+f_1 z^{-1}$ is shown in FIG. 10. In FIG. 10, an input symbol $y_k$ is received by the branch metric generator. The branch metric generator generates the seven branch metrics corresponding to the seven allowed transitions showed in the trellis diagram of FIG. 9. The branch metrics are input to an add-compare-select (ACS) circuit which calculates the state metrics $P_k$ and the predicted results $D_k$. The state metrics $P_k$ are inputted to the starting point determiner and the predicted results $D_R$ are inputted to the traceback circuit.

In this example, the seven branch metrics are given by:

$$M_k(0)=[y_k-1f_{-1}]^2;$$

$$M_k(1)=[y_k-1]^2;$$

$$M_k(2)=[y_k-f_1]^2;$$

$$M_k(3)=[y_k]^2;$$

$$M_k(4)=[y_k+f_1]^2;$$

$$M_k(5)=[y_k+1]^2; \text{ and}$$

$$M_k(6)=[y_k+1+f_1]^2. \quad (17)$$

If sequence detector is combined with a linear equalizer as shown in FIG. 6, then the symbol input $y_k$ to the sequence detector in FIG. 10 is replaced by the output of the linear equalizer, $r_k=y_k+g_1 y_{k-1}$ as in Equation 12 (neglecting noise), and the sequence detector is matched to the linear equalizer by setting $g_1=f_1$.

The three state metrics calculated in the ACS are:

$$p_k(+1)=\min\{p_{k-1}(+1)+M_k(0), p_{k-1}(0)+M_k(1)\};$$

$$p_k(0)=\min\{p_{k-1}(+1)+M_k(2), p_{k-1}(0)+M_k(3), p_{k-1}(-1)+M_k(4)\}; \text{ and}$$

$$p_k(+1)=\min\{p_{k-1}(0)+M_k(5), p_{k-1}(-1)+M_k(6)\}. \quad (18)$$

The results of the ACS are given by:

$$D_k(+1)=\{+1 \text{ if } p_k(+1)=p_{k-1}(+1)+M_k(0)$$

$$\{-1 \text{ if } p_k(+1)=p_{k-1}(0)+M_k(1)$$

$$D_k(0)=\{+1 \text{ if } p_k(0)=p_{k-1}(+1)+M_k(2)$$

$$\{0 \text{ if } p_k(0)=p_{k-1}(0)+M_k(3) \quad (19)$$

$$\{-1 \text{ if } p_k(0)=p_{k-1}(-1)+M_k(4)$$

$$D_k(-1)=\{-1 \text{ if } p_k(-1)=p_{k-1}(-1)+M_k(6)$$

$$\{0 \text{ if } p_k(-1)=p_{k-1}(0)+M_k(5)$$

These states and state metrics are stored in the memory of the traceback circuit.

As described above, the traceback circuit traces back from the best possible current state (the state with the smallest state metric), and fetches the data from the traceback memory. The symbol having the lowest state metric is output to the LIFO which outputs the last input first because the earliest received input symbol is the symbol decided on last.

The sequence detector appropriate for 100Base-TX Fast Ethernet as described above may additionally be combined with a linear equalizer as described above with FIG. 6 or with a combination of linear equalizer and decision feedback as described above with FIG. 7.

Application to 1000Base-T Long Haul Copper

The modulation format chosen by the IEEE 802.3ab standards committee for Gigabit Ethernet over category 5 copper cabling utilizes 5-level NRZ signaling given by the symbol alphabet $A=\{+2, +1, 0, -1, -2\}$. (See IEEE 802.3ab, Gigabit long haul copper physical layer standards committee, 1997).

Figure 11:
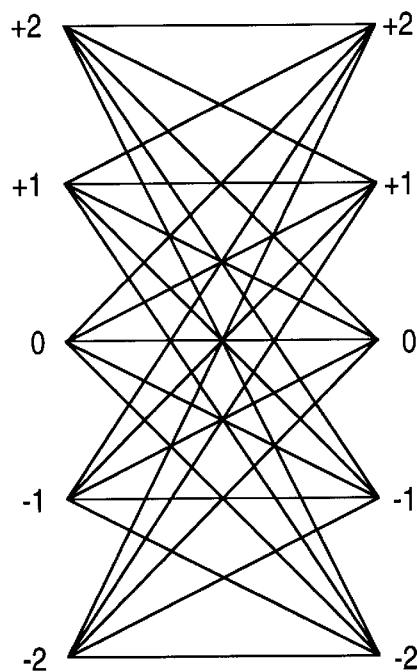
FIG. 11 shows a trellis diagram for N=1 and 5 level signaling.
Figure 12:
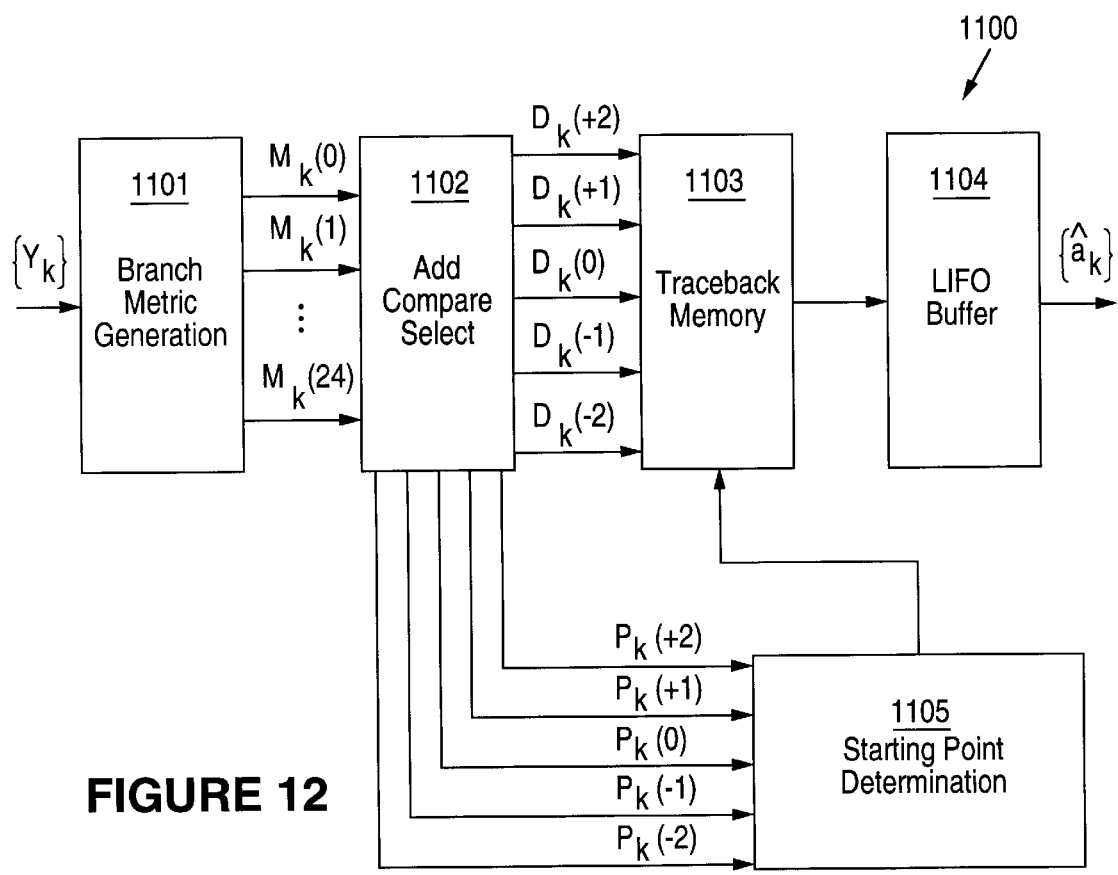
FIG. 12 shows a block diagram of a sequence equalizer with N=1 and five level signaling.

A trellis diagram for this application is shown in FIG. 11 assuming N=1 and a channel function $f(z)=1+f_1 z^{-1}$. A block diagram of the sequence detector is shown in FIG. 12. In FIG. 12, the input signal $y_k$ is received by the branch metric generator. The branch metric generator calculates the 25 branch metrics $M_k$ for input into the ACS circuit. The ACS circuit calculates the five state metrics $P_k$ and the five comparison decisions $D_k$ for input into the starting point determiner and the traceback circuit, respectively. The traceback circuit, with input from the starting point determiner, outputs to the LIFO the best symbol sequence $\{\hat{a}_k\}$ for output.

Branch metrics for N=1 and $f(z)=1+f_1 z^{-1}$, as in this example, are given by:

| | |
|---|---|
| $M_k(0) = [y_k - 2 - 2f_1]^2$ | $M_k(13) = [y_k + f_1]^2$ |
| $M_k(1) = [y_k - 2 - f_1]^2$ | $M_k(14) = [y_k + 2f_1]^2$ |
| $M_k(2) = [y_k - 2]^2$ | $M_k(15) = [y_k + 1 - 2f_1]^2$ |
| $M_k(3) = [y_k - 2 + f_1]^2$ | $M_k(16) = [y_k + 1 - f_1]^2$ |
| $M_k(4) = [y_k - 2 + 2f_1]^2$ | $M_k(17) = [y_k + 1]^2$ |
| $M_k(5) = [y_k - 1 - 2f_1]^2$ | $M_k(18) = [y_k + 1 + f_1]^2$ |
| $M_k(6) = [y_k - 1 - f_1]^2$ | $M_k(19) = [y_k + 1 + 2f_1]^2$ |
| $M_k(7) = [y_k - 1]^2$ | $M_k(20) = [y_k + 2 - 2f_1]^2$ |
| $M_k(8) = [y_k - 1 + f_1]^2$ | $M_k(21) = [y_k + 2 - f_1]^2$ |
| $M_k(9) = [y_k - 1 + 2f_1]^2$ | $M_k(22) = [y_k + 2]^2$ |
| $M_k(10) = [y_k - 2f_1]^2$ | $M_k(23) = [y_k + 2 + f_1]^2$ |
| $M_k(11) = [y_k - f_1]^2$ | $M_k(24) = [y_k + 2 + 2f_1]^2$ |

$$M_k(12)=[y_k]^2. \quad (20)$$

The state metrics as updated in the ACS are $$p_k(i)=\min_{j=\{-2, -1, 0, 1, 2\}}\{p_{k-1}(j)+M_k(2+j+5i)\}; \text{ for } i=\{2, 1, 0, -1, -2\}. \quad (21)$$

The ACS results for each of the five states are given by $$D_k(i)=j \text{ if } p_k(+1)=p_{k-1}(j)+Mk(2+j+5i); \text{ for } i=\{2, 1, 0, -1, -2\}; j=\{2, 1, 0, -1, -2\}. \quad (22)$$

The five state sequential equalizer described above can be used with linear equalization as described with FIG. 6. In that application, the input signal $y_k$ is replaced by the output signal of the linear equalizer $r_k = y_k + g_1^* a_{k-1}$, as in Equation 12 above (neglecting noise). The channel function of the sequential equalizer is then given by $f_1 = g_1$ to match the linear equalization. In addition, decision feedback equalization may also be used as described with FIG. 8.

The above examples are illustrative only and in no way should they be construed as limiting the scope of the invention. As such, the scope of the invention is limited only by the following claims.

APPENDIX

For the ISI channel described by Equation 8 above, we obtain an estimate of the sequence of transmitted data sequence $\{b_k\}$ of length $N$ by $$\min_{\{b_j\}} \sum_{i \leq N} [y_i - b_i - f_i b_{i-1}]^2.$$

Define:

$$p_k(b_k) = \min_{\{b_0, b_1, \ldots, b_{k-1}\}} \sum_{i \leq k} [y_i - b_i - f_i b_{i-1}]^2.$$

Therefore:

$$p_k(b_k) = \min_{b_{k-1}} \left[ \min_{\{b_0, b_1, \ldots, b_{k-2}\}} \left[ \sum_{i \leq (k-1)} [y_i - b_i - f_i b_{i-1}]^2 + [y_k - b_k - f_i b_{k-1}]^2 \right] \right]$$

$$= \min_{b_{k-1}} [p_{k-1}(b_{k-1}) + [y_k - b_k - f_i b_{k-1}]^2].$$

The above recursion is the basis for the update equation, Equation 10 above.

I claim:

1. A method of sequence detection of a communication channel with a symbol alphabet having A symbols and a channel function f(z), comprising:

receiving an input symbol in a kth time step, the input symbol being one of a sequence of input symbols;

calculating an array of branch metrics for the input symbol, each branch metric in the array of branch metrics being a measure of the difference between the input symbol and an array of predicted input symbols;

calculating a state metric for each of the A symbols in the symbol alphabet for the kth time step, the state metric being dependent on the state metric for the (k−1)th time step and the array of branch metrics;

determining a comparison result for each of the A symbols in the symbol alphabet in response to the state metric for each of the A symbols in the symbol alphabet and storing the comparison result for each of the A symbols for the kth time step in a traceback memory;

if the kth time step is a traceback time step, tracing back and outputting a best sequence of symbols based on the comparison results stored in the traceback memory.

2. A method of sequence detection as in claim 1, wherein A=2 and the symbol alphabet includes a first symbol and a second symbol.

3. A method of sequence detection as in claim 2, wherein:

the channel function is $f(z) = 1 + f_1 z^{-1}$;

the array of predicted input symbols includes a second-second prediction being $1 + f_1$, a first-second prediction being $1 - f_1$, a second-first prediction being $-1 + f_1$, and a first-first prediction being $-1 - f_1$;

calculating the array of branch metrics comprises, calculating the squared difference between the input symbol and a corresponding one of the array of predicted input symbols, the array of branch metrics having a second-second branch metric, a first-second branch metric, a second-first branch metric and a first-first branch metric;

calculating the state metric for the first symbol and the second symbol for the kth time step, the state metric for each of the 2 symbols having a first state metric and a second state metric, comprises:

for the first symbol state metric taking the lessor of the second symbol state metric for the (k−1)th time step plus the second-first branch metric and the first symbol state metric for the (k−1)th time step plus the first-first branch metric; and for the second symbol state metric taking the lessor of the second symbol state metric for the (k−1)th time step plus the second-second branch metric and the first symbol state metric for the (k−1)th time step plus the first-second branch metric; and determining the comparison result for the first symbol and the second symbol for the kth time step comprises the comparison result for the first symbol being the first symbol if the first symbol state metric is the first state metric for the (k−1)th time step plus the first-first branch metric;

the comparison result for the first symbol being the second symbol if the first symbol state metric is the second symbol state metric for the (k−1)th time step plus the second-first branch metric;

the comparison result for the second symbol being the second symbol if the second symbol state metric is the second symbol state metric for the (k−1)th time step plus the second-second branch metric; and the comparison result for the second symbol being the first symbol if the second symbol state metric is the first symbol state metric for the (k−1)th time step plus the first-second branch metric.

4. A method of sequence detection as in claim 1, wherein A=3 and the symbol alphabet includes a first symbol, a second symbol and a third symbol.

5. A method of sequence detection as in claim 1, wherein A=5 and the symbol alphabet includes a first symbol, a second symbol, a third symbol, a fourth symbol and a fifth symbol.

6. A method of sequence detection as in claim 4, wherein the channel function is $f(z) = 1 + f_1 z^{-1}$.

7. A method of sequence detection as in claim 5, wherein the channel function is $f(z) = 1 + f_1 z^{-1}$.

8. A sequence detector for a communication channel with a symbol alphabet having A symbols and a channel function f(z), comprising:

a branch metric generator, the branch metric generator calculating an array of branch metrics in response to an input symbol received in a kth time step and the channel function f(z);

an add-compare-select circuit coupled to the branch metric generator to receive the array of branch metrics, the add-compare-select circuit calculating a set of state metrics for the kth step and a set of comparison results for the kth time step in response to the set of state metrics for the (k−1)th time step and the array of branch metrics;

a starting state determiner coupled to the add-compare-select circuit to receive the set of state metrics and calculating a starting traceback state in response to the set of state metrics;

a traceback circuit coupled to the add-compare-select circuit to receive the set of comparison results for the kth step and coupled to the starting state determiner to receive the starting traceback state, the traceback circuit storing the comparison results for the (k−M)th time step through the kth time step, M being a traceback depth, and predicting a best sequence of symbols for the (k−M)th time step through the (k−M+L)th time step, L being less than M, every Lth time step; and a last-in-first-out buffer coupled to the traceback circuit to receive the best sequence of symbols for the (k−M)th time step through the (k−M+L)th time step and output the best sequence of symbols in proper temporal sequence.

9. A sequence detector as in claim 8, wherein A=2 and the symbol alphabet includes a first symbol and a second symbol.

10. A sequence detector as in claim 8, wherein A=3 and the symbol alphabet includes a first symbol, a second symbol and a third symbol.

11. A sequence detector as in claim 8, wherein A=5 and the symbol alphabet includes a first symbol, a second symbol, a third symbol, a fourth symbol and a fifth symbol.

12. A sequence detector as in claim 8, wherein:

the channel function is $f(z)=1+f_1 z^{-1}$;

the array of branch metrics comprises the squared difference between the input symbol and a corresponding one of an array of predicted input symbols, the array of predicted input symbols includes a second-second prediction being $1+f_1$, a first-second prediction being $1-f_1$, a second-first prediction being $-1+f_1$, and a first-first prediction being $-1-f_1$, the array of branch metrics having a second-second branch metric, a first-second branch metric, a second-first branch metric and a first-first branch metric;

the state metric for each of the 2 symbols having a first state metric and a second state metric wherein the first symbol state metric is the lessor of the second symbol state metric for the (k−1)th time step plus the second-first branch metric and the first symbol state metric for the (k−1)th time step plus the first-first branch metric; and the second symbol state metric is the lessor of the second symbol state metric for the (k−1)th time step plus the second-second branch metric and the first symbol state metric for the (k−1)th time step plus the first-second branch metric; and the comparison result for the first symbol being the first symbol if the first symbol state metric is the first state metric for the (k−1)th time step plus the first-first branch metric;

the comparison result for the first symbol being the second symbol if the first symbol state metric is the second symbol state metric for the (k−1)th time step plus the second-first branch metric;

the comparison result for the second symbol being the second symbol if the second symbol state metric is the second symbol state metric for the (k−1)th time step plus the second-second branch metric; and the comparison result for the second symbol being the first symbol if the second symbol state metric is the first symbol state metric for the (k−1)th time step plus the first-second branch metric.

13. A sequence detector as in claim 8, wherein the traceback depth M is 8 and L is 2.

14. A sequence detector as in claim 8, wherein the traceback depth M is 16 and L is 4.

15. A sequence detector as in claim 8, wherein L is M/4.

16. A sequence detector as in claim 10, wherein the channel function is $f(z)=1+f_1 z^{-1}$.

17. A sequence detector as in claim 11, wherein the channel function is $f(z)=1+f_1 z^{-1}$.

18. A sequence detector as in claim 8 and further including a linear equalizer having an input terminal and an output terminal, the output terminal of the linear equalizer being coupled to the input terminal of the branch metric generator.

19. A sequence detector as in claim 18 and further including a decision feedback portion, the decision feedback portion being coupled between the second output of the add-compare-select circuit and a second input of the branch metric generator, the array of branch metrics calculated by the branch metric generator further depending on the output of the decision feedback portion.

20. A detector, comprising:

a branch metric generator which computes a branch metric array having a branch metric for each of an array of state transitions and which receives the ACS decision for final states of the detector at a previous time cycle and computation of the branch metric array depends on the ACS decision for final states of the detector at a previous time cycle;

an add-compare-select circuit coupled to the branch metric generator which determines a state metric for each state of the detector and an ACS decision for each final state of the detector;

a traceback circuit coupled to the add-compare-select circuit; and a starting state determiner coupled between the add-compare select circuit and the traceback circuit.

21. A detector, comprising:

a branch metric generator which computes a branch metric array having a branch metric for each of an array of state transitions;

an add-compare-select circuit coupled to the branch metric generator which determines a state metric for each state of the detector and an ACS decision for each final state of the detector;

a traceback circuit coupled to the add-compare-select circuit which stores the ACS decisions and on designated time cycles traces a sequence of states back from a starting state determined by the starting state determiner to determine an output sequence of symbols; and a starting state determiner coupled between the add-compare select circuit and the traceback circuit.

22. The detector of claim 21, wherein states of the detector include the influence of one ISI symbol.

23. The detector of claim 21, wherein states of the detector include the influence of two ISI symbols.

24. The detector of claim 21, wherein states of the detector include the influence of more than two ISI symbols.

25. The detector of claim 21, wherein the state of the detector includes symbols from a symbol alphabet having A symbols.

26. The detector of claim 25, wherein A is two and the symbol alphabet includes the symbols +1 and −1.

27. The detector of claim 25, wherein A is three and the symbol alphabet includes the symbols +1, 0, and −1.

28. The detector of claim 25, wherein A is five and the symbol alphabet includes the symbols +2, +1, 0, −1 and −2.

* * * * *